United States Patent
Okubo et al.

(10) Patent No.: US 7,218,447 B2
(45) Date of Patent: May 15, 2007

(54) DIAMOND-LIKE CARBON FILM AND METHOD FOR QUALITATIVELY TRANSFORMING DIAMOND-LIKE CARBON FILM

(75) Inventors: Soichiro Okubo, Itami (JP); Takashi Matsuura, Itami (JP)

(73) Assignee: Sumitomo Electric Industries, Ltd, Osaka (JP)

(*) Notice: Subject to any disclaimer, the term of this patent is extended or adjusted under 35 U.S.C. 154(b) by 0 days.

(21) Appl. No.: 10/711,262

(22) Filed: Sep. 7, 2004

(65) Prior Publication Data

US 2005/0018327 A1 Jan. 27, 2005

Related U.S. Application Data

(63) Continuation of application No. 10/065,738, filed on Nov. 14, 2002, now Pat. No. 6,813,076.

(30) Foreign Application Priority Data

Dec. 20, 2001 (JP) .............................. 2001-387730
Mar. 25, 2002 (JP) .............................. 2002-082784

(51) Int. Cl.
*G02B 5/30* (2006.01)
(52) U.S. Cl. ...................... 359/500; 359/495; 359/497; 252/585; 427/163.1
(58) Field of Classification Search ............... 359/5, 359/6, 7, 577
See application file for complete search history.

(56) References Cited

U.S. PATENT DOCUMENTS 5,294,518 A * 3/1994 Brady et al. ................. 430/290
6,428,894 B1 * 8/2002 Babich et al. ............... 428/408
6,545,809 B1 * 4/2003 Phillips ....................... 359/577
2003/0086056 A1 * 5/2003 Gupta et al. ................. 351/177
2005/0152037 A1 * 7/2005 Shiozaki et al. ............. 359/573

FOREIGN PATENT DOCUMENTS

JP        S55-048159 U        3/1980

(Continued)

OTHER PUBLICATIONS

Ken-ichi Kawamura, et al., "Holographic Encoding of Permanent Gratings Embedded in Diamond by Two Beam Interference of a Single Femtosecond Near-Infrared Laser Pulse", Jpn. J. Appl. Phys. vol. 39, Part 2, No. 8a pp. L767-L769, Aug. 1, 2000.*

(Continued)

*Primary Examiner*—Arnel Lavarias
*Assistant Examiner*—Derek S. Chapel
(74) *Attorney, Agent, or Firm*—James W. Judge

(57) ABSTRACT

A diamond-like carbon (DLC) film having refractive indices distributed in a pattern oriented within the plane of the film or on a bias with respect to the thickness of the film. Such films may be useful in low-cast Faraday rotators, in polarizers (analyzers), and in magnetic substances, and in Faraday rotators and optical isolators that can handle a plurality of wavelengths. The refractive index structure may be imparted to the DLC film, for example, by irradiating at least one region of the film with either a particle or energy beam.

12 Claims, 9 Drawing Sheets

FOREIGN PATENT DOCUMENTS

| | | | |
|---|---|---|---|
| JP | S62-056923 A | | 3/1987 |
| JP | 05-273425 A | * | 10/1993 |
| JP | H10-020248 A | | 1/1998 |
| JP | 2001-110635 A | | 4/2001 |
| JP | 2001-194639 A | | 7/2001 |
| JP | 2001-291714 A | | 10/2001 |

OTHER PUBLICATIONS

D.P. Dowling, et al., "The use of refractive index as a measure of diamond-like carbon film quality", Diamond and Related Materials, 7 (1998), pp. 432-434. (ELSEVIER).*

Klyui et al., Nitrogen-Doped DLC Films: Correlation between Optical and Mechanical Properties, vol. 5, Apr. 1997, pp. 341-347.*

M. Inoue, et al., "Magneto-Optical Figure-of-Merit Parameters of Localized Modes in One-Dimensional Magnetophotonic Crystals," The Magnetics Society of Japan, Jul. 1, 1999, pp. 1861-1866, Vol. 23, No. 7, The Magnetics Society of Japan, Tokyo, Japan.

T. Takayama, et al., "Preparation and Properties of One-Dimensional Magnetophotonic Crystals with Bi-Substituted YIG Films," The Magnetics Society of Japan, Apr. 15, 2000, pp. 391-394, Vol. 24, No. 4-2, The Magnetics Society of Japan, Tokyo, Japan.

M. L. Reed, et al., "Room Temperature Ferromagnetic Properties, of (Ga, Mn)N," Applied Physics Letters, Nov. 19, 2001, pp. 3473-3475, Vol. 79, No. 21, American Institute of Physics, NY.

ULVAC, "Success in Synthesis about Gallium Nitride (GaN) Series Material Showing Room Temperature Ferromagnetic Property, First in the World," URL:http://www.ulvac.co.jp/information/news/2001/20010906.html, Sep. 2001 (Search date Nov. 29, 2006), Ulvac Japan, Chigasaki-shi, Japan.

* cited by examiner

Polarization extinction ratio −35 dB at 1300 nm

DIAMOND-LIKE CARBON FILM AND METHOD FOR QUALITATIVELY TRANSFORMING DIAMOND-LIKE CARBON FILM

BACKGROUND OF INVENTION

1. Field of the Invention

The present invention relates to Faraday rotators, optical isolators, polarizers and diamond-like carbon thin films, and more particularly relates to—in optical communications fields—Faraday rotators for rotating light-wave polarization planes, optical isolators for blocking return beams from a light source, polarizers for transmitting only a given polarized component of light, and to diamond-like carbon thin films utilized as materials in optical communications fields.

2. Background Art

In optical communications systems constituted from optical fibers and optical elements, reflected light from optical-connector junctions and optical circuit components is sometimes reintroduced to the light source. Noise produced by beams returning to a light source—especially to a semiconductor laser—often turns out to be a major problem in designing optical communications systems and optical devices.

The means commonly used for blocking off the return beams is an optical isolator, whose constituent elements are a Faraday rotator, a polarizer, an analyzer, and a magnetic part.

By virtue of the magnetic part applying a magnetic field to a magneto-optical body (magneto-optical material), Faraday rotators rotate the polarization plane of an incident light beam traveling in the direction of the magnetic field. Meanwhile, polarizers (analyzers) allow only a given polarized light component to pass, and block components apart from that which is polarized.

As illustrated in FIG. 14, an optical isolator 6 is configured as an assembly of a polarizer 2, a Faraday rotator 3, an analyzer 4, and a magnetic part 5, and the non-repelling characteristics of the magneto-optical material are exploited to block the incident light from being reintroduced from the opposite direction. A general optical-isolator assembly will be more specifically described in the following, while reference is made to FIG. 14.

Incident light from a light source 1 initially is filtered through the polarizer 2 into a polarization plane, and then transits the Faraday rotator 3, whereby the polarization plane is rotated 45 degrees. With its polarization plane rotated by 45 degrees the incident light passes through and radiates as it is from the analyzer 4, and in part once more enters the analyzer 4 as a return beam and is reintroduced into the Faraday rotator 3. The polarization plane of the return beam is again rotated 45 degrees by the Faraday rotator 3, and with its polarization plane having been rotated 90 degrees in total, the return beam is unable to pass through the polarizer 2, where the return beam is thus blocked off.

It will be understood that the arrows drawn at certain angles with respect to the arrows indicating either the light emitted from the light source 1 or the return beam are schematic representations of the polarization directions of either the emitted light or the return beam.

Yttrium iron garnet (YIG hereinafter) crystals or bismuth-substituted garnet crystals have usually been used for conventional Faraday rotators (magneto-optical bodies). Furthermore, for conventional polarizers (analyzers), rutile (titanium oxide) monocrystals or glass superficially onto which silver particles are orientated in a single direction are usually used, while for the magnetic part that applies a magnetic field to the magneto-optical body, samarium-based rare-earth magnetic substances are used.

The YIG crystals or bismuth-substituted garnet crystals chiefly used for conventional Faraday rotators must have a certain thickness to obtain a needed Faraday rotation angle, which results in a large external form. Likewise, the external form becomes large in the case of the rutile monocrystals and the glass onto which silver particles are superficially orientated in a single direction, that have been chiefly used for conventional polarizers (analyzers), and the samarium-based rare-earth magnetic substances chiefly used as the magnetic part for applying a magnetic field to the magneto-optical body, since they must occupy a certain volume. What is more, with conventional isolators especially—whose basic constituent elements are a Faraday rotator, a polarizer (analyzer) and a magnetic part—has been the problem of being large-sized overall.

Meanwhile, Faraday rotators, polarizers (analyzers) and magnetic bodies are expensive, making conventional optical isolators in which these are the constituent elements cost all the more. A further problem has been that because the individual constituent elements in conventional optical isolators are independent, their assembly process is complex, adding that much more to the cost.

Moreover, because as a general rule what determines a Faraday-rotator angle is its thickness, conventional Faraday rotators can only correspond to a single wavelength. The consequent problem too with conventional optical isolators having a conventional Faraday rotator as a constituent element has been that they basically can handle only a single wavelength.

SUMMARY OF INVENTION

Given the foregoing, objects of this invention are: first, to miniaturize and hold down the cost of, respectively, Faraday rotators, polarizers, analyzers, magnetic bodies, and optical isolators in which these are the constituent elements; second, to enable a Faraday rotator and an optical isolator to handle a plurality of wavelengths; and third, a new material useful in miniaturizing and in lowering the cost and enhancing the performance of polarizers to begin with, and of various optical devices.

The invention in being a Faraday rotator having wavelength selectivity, for selectively rotating only the polarization plane of incident light of given wavelengths, is characterized in being furnished with: a magneto-optical part that rotates the polarization plane of incident light traveling in the direction of its magnetic field; and a dielectric multi-layer film in which a low refractive-index layer and a high refractive-index layer are laminated in alternation, for localizing within the magneto-optical part incident light of at least one wavelength.

Preferably, the dielectric multi-layer film is characterized in localizing within the magneto-optical part incident light beams of plural wavelengths.

Further preferably, the magneto-optical part is characterized in being constituted from a gadolinium iron garnet thin film.

Further preferably, the dielectric multi-layer film is characterized in being composed by laminating in alternation silicon oxide as a low refractive-index layer, and titanium oxide as a high refractive index layer.

Further preferably, the magneto-optical part and the dielectric multi-layer film are characterized in being formed integrally by a vapor-phase process.

Under a separate aspect the invention in being an optical isolator having wavelength selectivity, for selectively blocking only return beams from incident light of given wavelengths, is characterized in being furnished with: a magneto-optical part for rotating the polarization plane of incident light traveling in the direction of its magnetic field; a magnetic part for applying a magnetic field to the magneto-optical part; a dielectric multi-layer film in which a low refractive-index layer and a high refractive-index layer are laminated in alternation, for localizing within the magneto-optical part incident light of at least one wavelength; a polarizer for picking out polarized components from incident beams; and an analyzer utilized in combination with the polarizer.

Preferably, the dielectric multi-layer film is characterized in localizing within the magneto-optical part incident light beams of plural wavelengths.

Further preferably, the magneto-optical part is characterized in being constituted from a gadolinium iron garnet thin film.

Further preferably, the magnetic part is characterized in being constituted from a gallium-nitride magnetic semiconductor thin film that exhibits ferromagnetism at room temperature and is transparent to light.

Further preferably, the dielectric multi-layer film is characterized in being composed by laminating in alternation silicon oxide as a low refractive-index layer, and titanium oxide as a high refractive index layer.

Further preferably, the polarizer and the analyzer are characterized in being lent a structure having distributed refractive indices, by irradiating with either a particle beam or an energy beam a diamond-like carbon (DLC) thin film along a bias with respect to the film's thickness direction.

Further preferably, the particle beam is characterized in being an ion beam, an electron beam, a proton beam, $\alpha$-rays, or a neutron beam; and the energy beam in being light rays, X-rays or $\gamma$-rays.

Further preferably, the magneto-optical part, the magnetic part, the dielectric multi-layer film, the polarizer, and the analyzer are characterized in being formed integrally by a vapor-phase process.

Further preferably, the polarizer and the analyzer are characterized in utilizing a diamond-like carbon thin film that is transparent in the light region, and that has an extinction coefficient that is $3 \times 10^{-4}$ or less at optical-communications wavelengths of from 1200 nm to 1700 nm.

Under another aspect the invention in being a polarizer is characterized in being lent a structure having distributed refractive indices, by irradiating with either a particle beam or an energy beam a diamond-like carbon thin film along a bias with respect to the film's thickness direction.

Preferably, the particle beam is characterized in being an ion beam, an electron beam, a proton beam, $\alpha$-rays, or a neutron beam; and the energy beam in being light rays, X-rays or $\gamma$-rays.

Further preferably, the polarizer is characterized in utilizing a diamond-like carbon thin film that is transparent in the light region, and that has an extinction coefficient that is $3 \times 10^{-4}$ or less at optical-communications wavelengths of from 1200 nm to 1700 nm.

According to another aspect of the invention, the diamond-like carbon thin film is characterized in being transparent in the light region, and in having an extinction coefficient that is $3 \times 10^{-4}$ or less at optical-communications wavelengths of from 1200 nm to 1700 nm.

Further preferably, optics components are characterized in utilizing a diamond-like carbon thin film that is transparent in the light region, and whose extinction coefficient is $3 \times 10^{-4}$ or less at optical-communications wavelengths of from 1200 nm to 1700 nm.

Accordingly, under this invention, miniaturizing and moreover holding down the costs of Faraday rotators, polarizers, analyzers, magnetic parts, and optical isolators having these as their constituent elements, is made possible. Likewise, manufacturing Faraday rotators and optical isolators that can handle plural wavelengths is made possible. Furthermore, a new material useful in miniaturizing and in lowering the cost and enhancing the performance of polarizers to begin with, and of various sorts of optical devices, can be provided.

From the following detailed description in conjunction with the accompanying drawings, the foregoing and other objects, features, aspects and advantages of the present invention will become readily apparent to those skilled in the art.

DETAILED DESCRIPTION

Embodiments of the invention will be explained in detail in the following with reference to the drawings. It will be understood that identical or equivalent parts in the figures are labeled with the same reference marks and explanation thereof will not be repeated.

Embodiment 1

Figure 1:
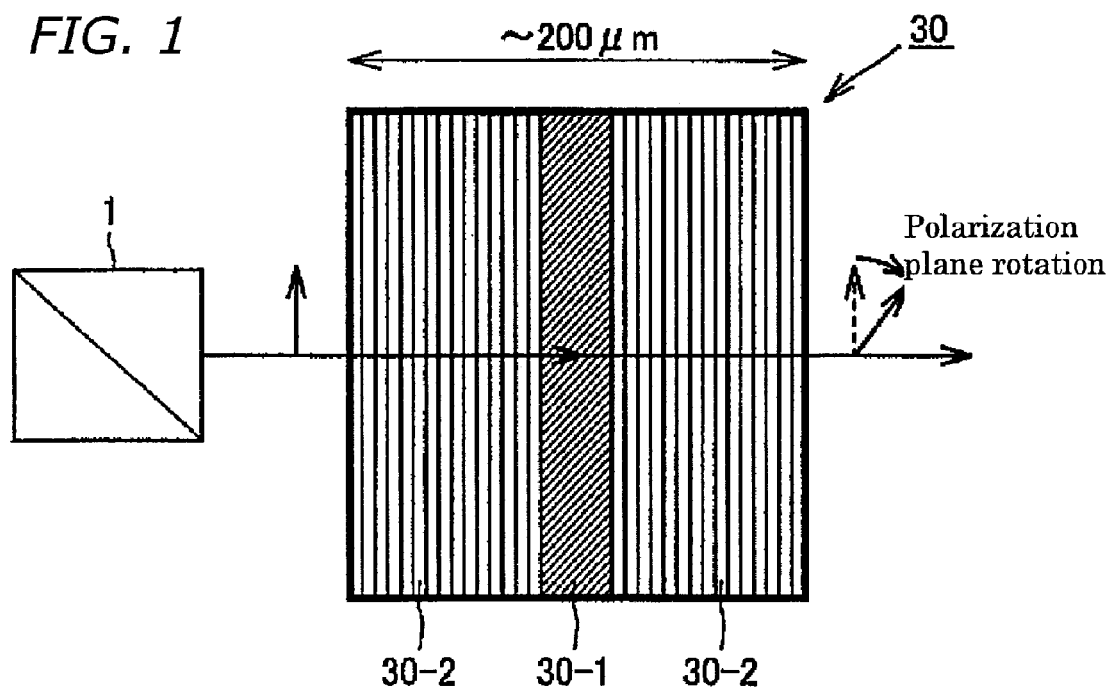
FIG. 1 is a view schematically illustrating a Faraday rotator of Embodiment 1 according to the invention.

FIG. 1 is a view schematically illustrating a Faraday rotator of Embodiment 1 according to the invention.

This Faraday rotator 30 is furnished with, as shown in FIG. 1, a magneto-optical part 30-1 for rotating the polarization plane of incident light traveling in the direction of its magnetic field, and dielectric multi-layer films 30-2 for localizing within the magneto-optical part 30-1 incident light of at least one wavelength.

The magneto-optical part 30-1 is constituted from a gadolinium iron garnet (GIG hereinafter) thin film, and the dielectric multi-layer films 30-2 are composed by laminating in alternation silicon dioxide as a low refractive-index layer, and titanium dioxide as a high refractive index layer.

As shown in FIG. 1, the Faraday rotator 30 is constituted by arranging the dielectric multi-layer films 30-2 on either side of the magneto-optical part 30-1 to create a resonant structure. The resonant structure of the dielectric multi-layer films 30-2 enables localizing in the magneto-optical part 30-1 incident light of a given wavelength. This as a result makes it possible to selectively rotate the polarization plane of incident light of a given wavelength.

Moreover, either adjusting the thickness of the magneto-optical part 30-1, or interlaminating additional dielectric layer(s) into the magneto-optical part 30-1, makes possible selectively rotating the polarization plane of incident light of not only a single but also a plurality of wavelengths. Furthermore, adjusting the thickness and layout of the magneto-optical part 30-1 (including such additional dielectric layers as have been interlaminated therein) and the dielectric multi-layer films 30-2 enables controlling the wavelength, and controlling the number of wavelengths, of the incident-light whose polarization plane is rotated.

In the following, the fact that the wavelength of, and the number of wavelengths of, the incident-light whose polarization plane is rotated are controllable by adjusting the thickness and layout of the magneto-optical part 30-1 (including such additional dielectric layers as have been interlaminated therein) and the dielectric multi-layer films 30-2 will be explained using simulation results in FIGS. 2 through 7.

FIGS. 2 through 7 are diagrams representing, according to simulations, the function of Faraday rotators that selectively rotate the polarization plane of incident light of given wavelength(s). Data for tantalum oxide ($Ta_2O_5$) as a substitute for a GIG thin film, and further, data for silicon dioxide ($SiO_2$) as a low refractive-index layer and for titanium dioxide as a high refractive-index layer in the dielectric multi-layer film, are respectively used for the simulations illustrated by FIGS. 2 through 7.

Transmission characteristics yielded in shining infrared light of 1000 to 2000 nm in wavelength on a multi-layer film made up of the tantalum oxide, silicon dioxide, and titanium dioxide were calculated from the simulations.

Figure 2:
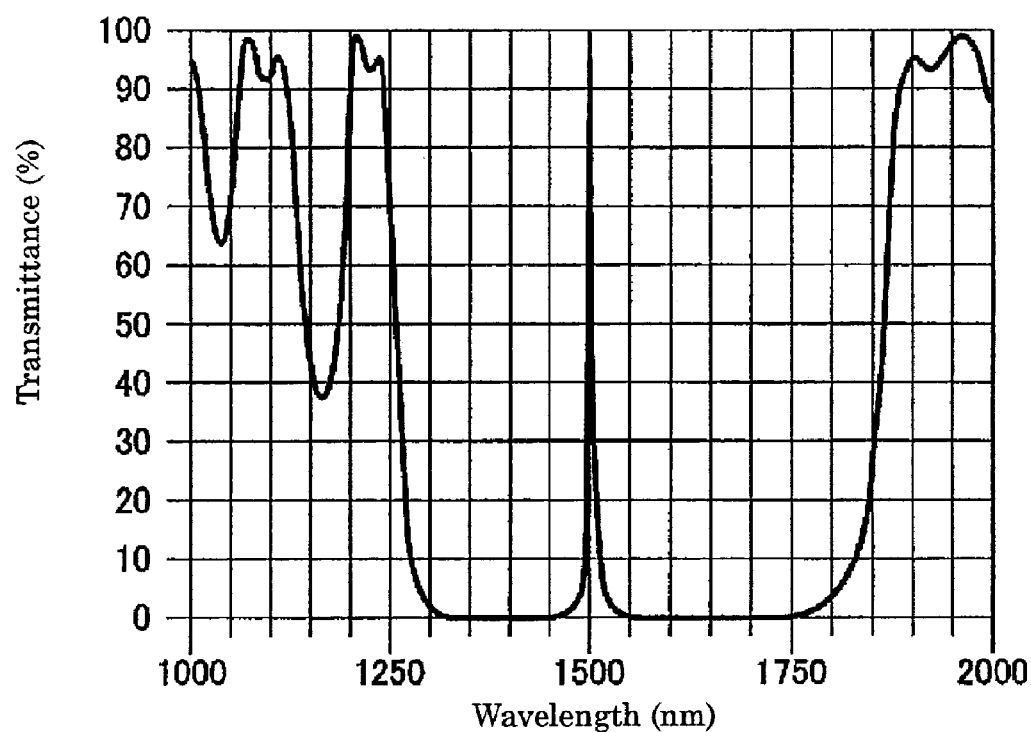
FIG. 2 is a diagram representing, according to a simulation, the function of a Faraday rotator for a single wavelength.

FIG. 2 is a diagram representing, according to a simulation, the function of a Faraday rotator that selectively rotates only the polarization plane of incident light of a single wavelength.

The multi-layer film structure for FIG. 2 may be represented as 1L (1H 1L)$^5$ 2M (1L 1H)$^5$ 1L, wherein L represents silicon dioxide; H, titanium dioxide; and M, tantalum oxide as a GIG thin-film substitute. The coefficients attached in front of L, H and M represent the optical film thickness set out by a 1500-nm wavelength design, and in practice the physical film thickness d is expressed by $$d=(1/4n)\lambda$$

when the optical membrane thickness is 1L given that the refractive index of silicon dioxide is n. Further, (1L 1H)$^5$ signifies five laminae each, ten total laminae, of the titanium dioxide and silicon dioxide layers being laminated in alternation.

When this multi-layer film structure is illuminated with infrared light 1000 to 2000 nm in wavelength, as shown in FIG. 2, only incident light approximately 1500 nm in wavelength resonates within the magneto-optical part; and incident light in the vicinity thereof, in a wavelength region of from roughly 1250 nm to 1850 nm, is blocked. That a Faraday rotator made up of the multi-layer film structure in FIG. 2 acts to selectively rotate only the polarization plane of incident light of a single wavelength, by localizing within the magneto-optical part incident light of a single wavelength, can be ascertained from the results of this simulation.

Figure 3:
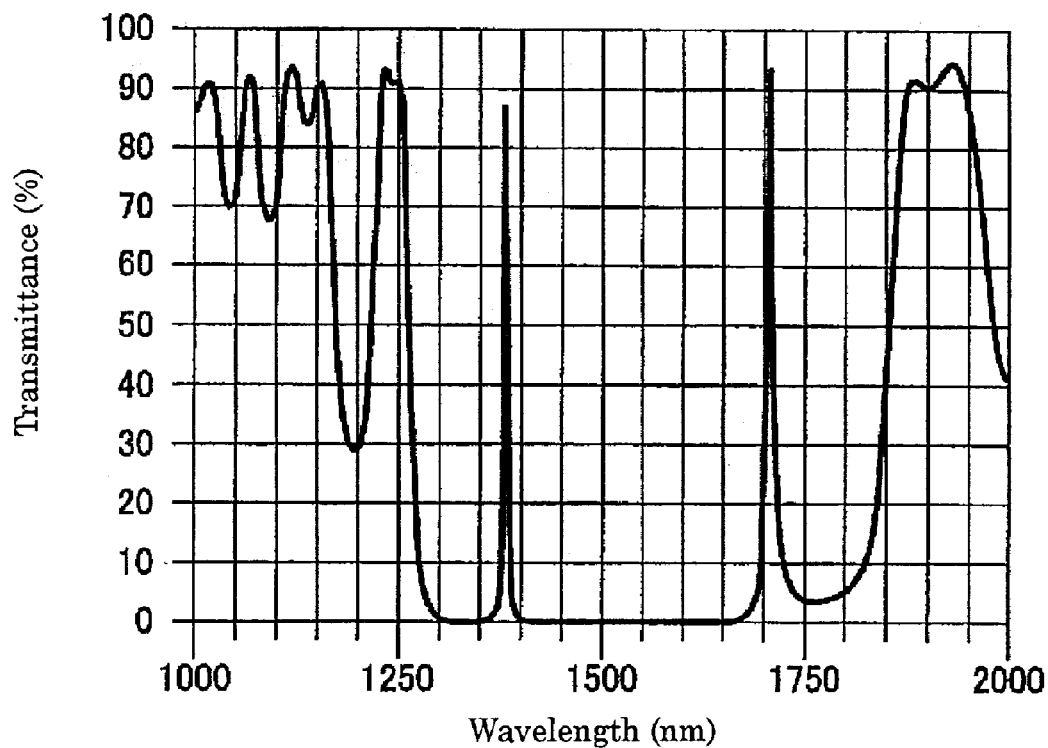
FIG. 3 is a diagram representing, according to a simulation, the function of a Faraday rotator for two wavelengths.

FIG. 3 is a diagram representing, according to a simulation, the function of a Faraday rotator that selectively rotates only the polarization planes of incident light of two wavelengths.

The multi-layer film structure for FIG. 3 may be represented as 1L (1H 1L)$^6$ 5.2M (1L 1H)$^6$ 1L. The significance of the symbols that represent the multi-layer film structure is likewise as with FIG. 2.

When this multi-layer film structure is illuminated with infrared light 1000 to 2000 nm in wavelength, as shown in FIG. 3, only incident light approximately 1380 nm in wavelength and approximately 1710 nm in wavelength resonates within the magneto-optical part; and incident light in the vicinity thereof, in a wavelength region of from roughly 1250 nm to 1850 nm, is blocked. From these simulation results, it is evident that plural incident beams of two wavelengths can be localized within a magneto-optical part by altering the thickness of the magneto-optical part in the multi-layer film structure for FIG. 2. That a Faraday rotator made up of the multi-layer film structure in FIG. 3 acts to selectively rotate only the polarization planes of incident light of two wavelengths can be ascertained from these results.

Figure 4:
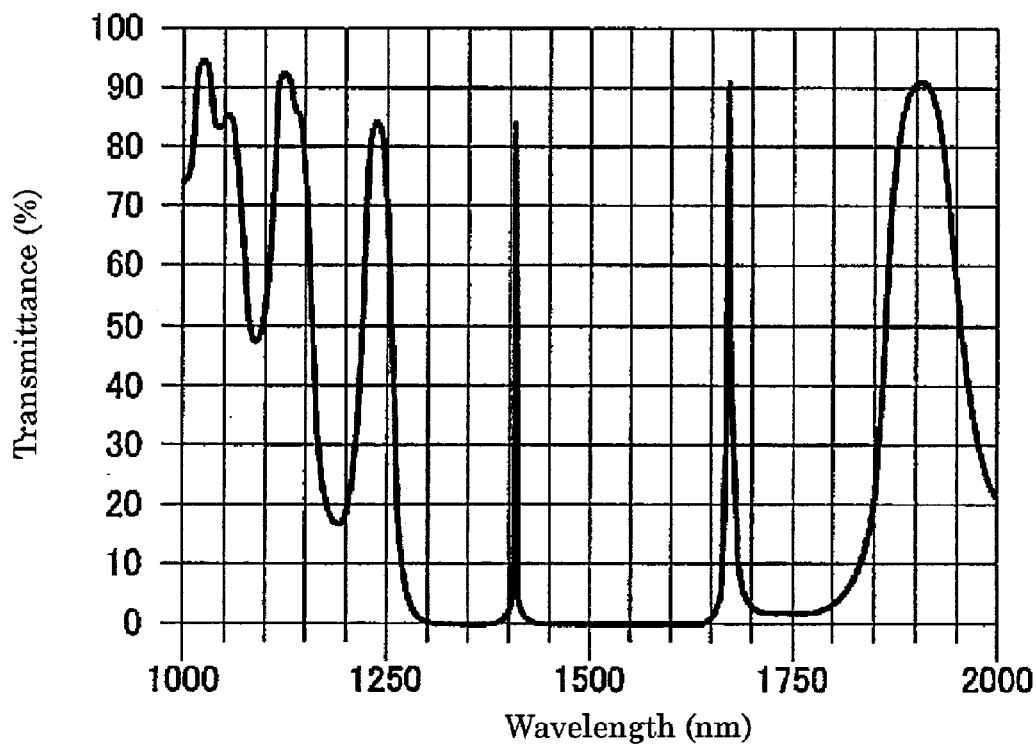
FIG. 4 is a diagram representing, according to a simulation, the function of a Faraday rotator for two wavelengths.

FIG. 4, like FIG. 3, is a diagram representing, according to a simulation, the function of a Faraday rotator that selectively rotates only the polarization planes of incident light of two wavelengths.

The multi-layer film structure for FIG. 4 may be represented as 1L (1H 1L)$^6$ 2.2M 1L 2M (1L 1H)$^6$ 1L. The significance of the symbols that represent the multi-layer film structure is likewise as with FIG. 2.

When this multi-layer film structure is illuminated with infrared light 1000 to 2000 nm in wavelength, as shown in FIG. 4, only incident light approximately 1410 nm in wavelength and approximately 1670 nm in wavelength resonates within the magneto-optical part; and incident light in the vicinity thereof, in a wavelength region of from roughly 1250 nm to 1850 nm, is blocked. From these simulation results, it is evident that plural incident beams of two wavelengths can also be localized within a magneto-optical part by interlaminating dielectric layers into the magneto-optical part in the multi-layer film structure for FIG. 2. That by interlaminating dielectric layers into its magneto-optical part, a Faraday rotator made up of the multi-layer film structure in FIG. 4 acts to selectively rotate only the polarization planes of incident light of two wavelengths, as with FIG. 3, can be ascertained from these results.

Figure 5:
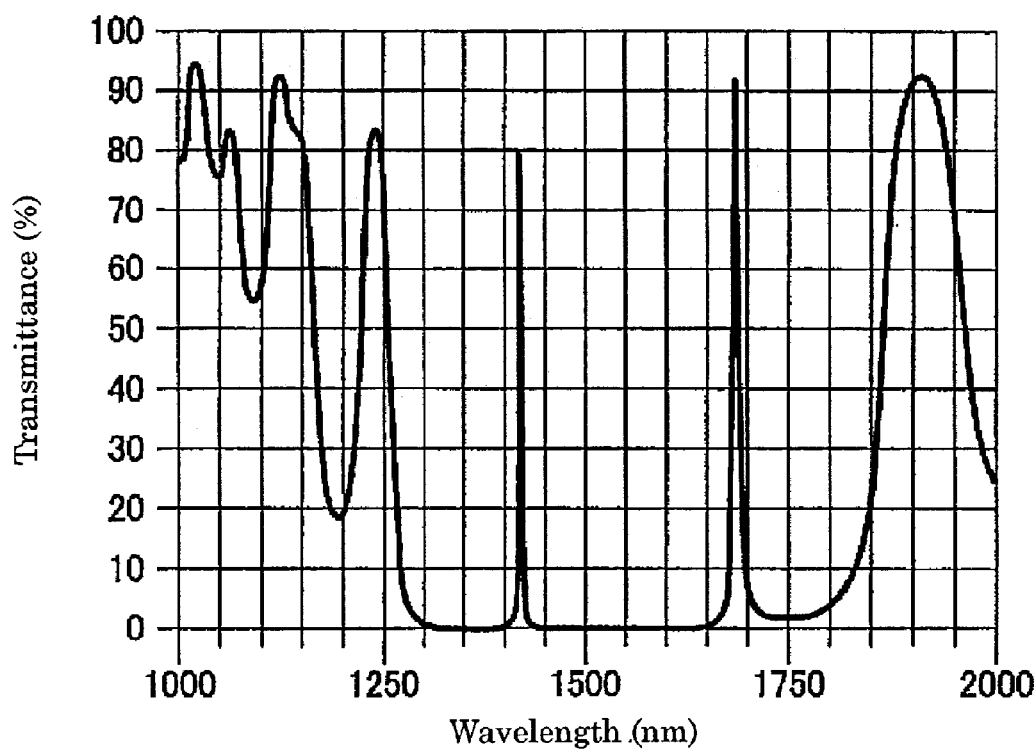
FIG. 5 is a diagram representing, according to a simulation, the function of a Faraday rotator for two wavelengths.

FIG. 5, like FIG. 3, is a diagram representing, according to a simulation, the function of a Faraday rotator that selectively rotates only the polarization planes of incident light of two wavelengths.

The multi-layer film structure for FIG. 5 may be represented as 1L (1H 1L)$^6$ 2.3M 1L 2M (1L 1H)$^6$ 1L. The significance of the symbols that represent the multi-layer film structure is likewise as with FIG. 2.

When this multi-layer film structure is illuminated with infrared light 1000 to 2000 nm in wavelength, as shown in FIG. 5, only incident light approximately 1420 nm in wavelength and approximately 1690 nm in wavelength resonates within the magneto-optical part; and incident light in the vicinity thereof, in a wavelength region of from roughly 1250 nm to 1850 nm, is blocked. From these simulation results, it is evident that the resonant peak values of two wavelengths of incident light that is localized within a magneto-optical part can be varied by adjusting the thickness of the magneto-optical part in the multi-layer film structure for FIG. 4. That by adjusting the thickness of its magneto-optical part, a Faraday rotator made up of the multi-layer film structure in FIG. 5 acts to selectively rotate only the polarization planes of incident light of two wavelengths that are different from those in FIG. 4 can be ascertained from these results.

Figure 6:
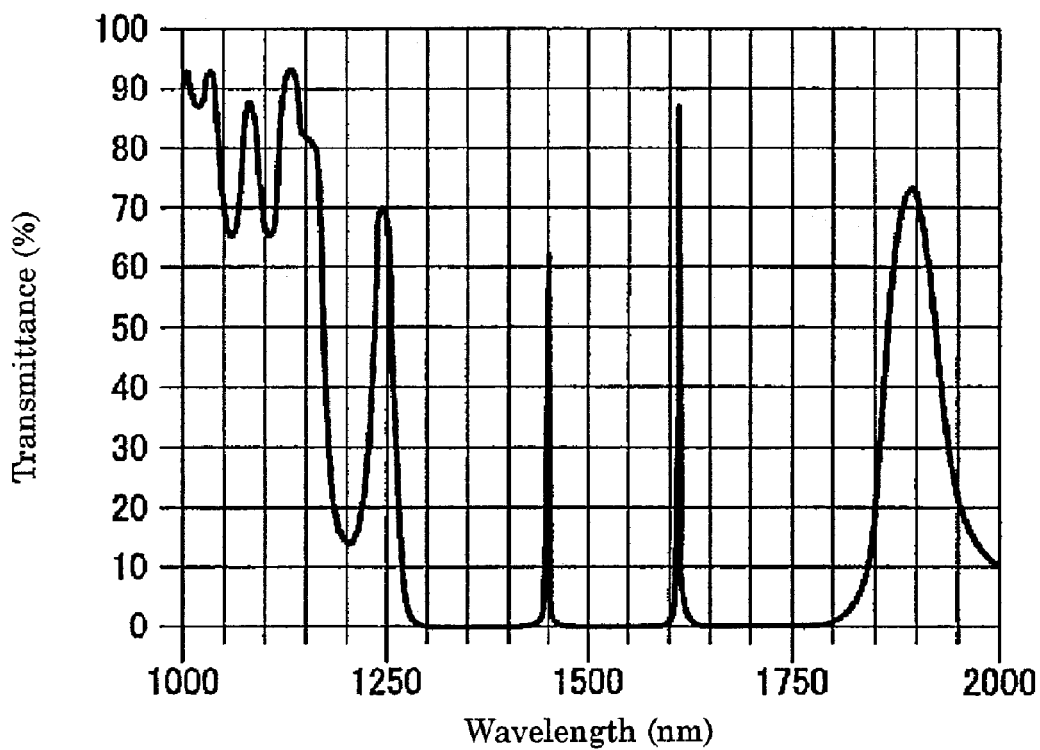
FIG. 6 is a diagram representing, according to a simulation, the function of a Faraday rotator for two wavelengths.

FIG. 6, like FIG. 3, is a diagram representing, according to a simulation, the function of a Faraday rotator that selectively rotates only the polarization planes of incident light of two wavelengths.

The multi-layer film structure for FIG. 6 may be represented as 1L (1H 1L)$^6$ 2.2M 1L 1H 1L 2M (1L 1H)$^6$ 1L. The significance of the symbols that represent the multi-layer film structure is likewise as with FIG. 2.

When this multi-layer film structure is illuminated with infrared light 1000 to 2000 nm in wavelength, as shown in FIG. 6, only incident light approximately 1450 nm in wavelength and approximately 1620 nm in wavelength resonates within the magneto-optical part; and incident light in the vicinity thereof, in a wavelength region of from roughly 1250 nm to 1850 nm, is blocked. From these simulation results, it is evident that the resonant peak values of two wavelengths of incident light that is localized within a magneto-optical part can be varied also by adjusting the thickness of dielectric layers that are interlaminated into the magneto-optical part in the multi-layer film structure for FIG. 4. That by adjusting the thickness of dielectric layers that are interlaminated into its magneto-optical part, a Faraday rotator made up of the multi-layer film structure in FIG. 6 acts to selectively rotate only the polarization planes of incident light of two wavelengths that are different from those in FIG. 4 can be ascertained from these results.

Figure 7:
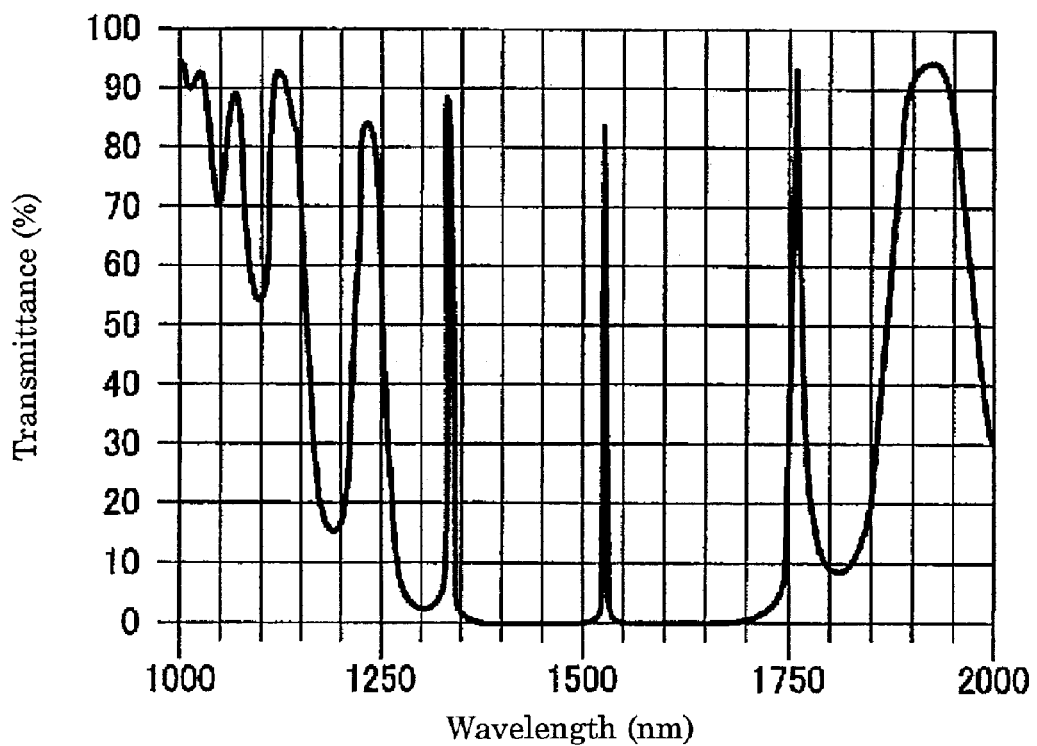
FIG. 7 is a diagram representing, according to a simulation, the function of a Faraday rotator for three wavelengths.

FIG. 7 is a diagram representing, according to a simulation, the function of a Faraday rotator that selectively rotates only the polarization planes of incident light of three wavelengths.

The multi-layer film structure for FIG. 7 may be represented as 1L (1H 1L)$^6$ 2.2M 4L 2M (1L 1H)$^6$ 1L. The significance of the symbols that represent the multi-layer film structure is likewise as with FIG. 2.

When this multi-layer film structure is illuminated with infrared light 1000 to 2000 nm in wavelength, as shown in FIG. 7, only incident light approximately 1330 nm in wavelength, approximately 1530 nm in wavelength, and approximately 1760 nm in wavelength resonates within the magneto-optical part; and incident light in the vicinity thereof, in a wavelength region of from roughly 1250 nm to 1850 nm, is blocked. From these simulation results, it is evident that plural incident beams of three wavelengths can be localized within a magneto-optical part by adjusting the thickness and layout of the magneto-optical part, and of dielectric layers that are interlaminated into the magneto-optical part, in the multi-layer film structure for FIG. 2. That a Faraday rotator made up of the multi-layer film structure in FIG. 7 acts to selectively rotate only the polarization planes of incident light of three wavelengths can be ascertained from these results.

From the simulation results in FIGS. 2 through 7, it is evident that the wavelength of, and the number of wavelengths of, incident light whose polarization planes may be rotated utilizing the Faraday rotator 30 are controllable by adjusting the thickness and layout of the magneto-optical part 30-1 (including such additional dielectric layers as have been interlaminated therein) and the dielectric multi-layer films 30-2.

Thus from the foregoing, according to Embodiment 1, by means of a resonant structure in which the dielectric multi-layer films 30-2 are arranged on either side of the magneto-optical part 30-1, the Faraday rotator 30 is capable of localizing incident light of not only a single wavelength, but also a plurality of wavelengths, within the magneto-optical part 30-1.

Moreover, being that the magneto-optical part 30-1 and the dielectric multi-layer films 30-2 are jointly a thin-film structure, integrating them both is possible by means of thin-film lamination technology. This accordingly makes possible miniaturizing, and curtailing the cost of, the magneto-optical part 30-1, the dielectric multi-layer films 30-2, and the Faraday rotator 30 in which they both are assembled, and furthermore simplifies the Faraday rotator 30 manufacturing process.

Embodiment 2

Figure 8:
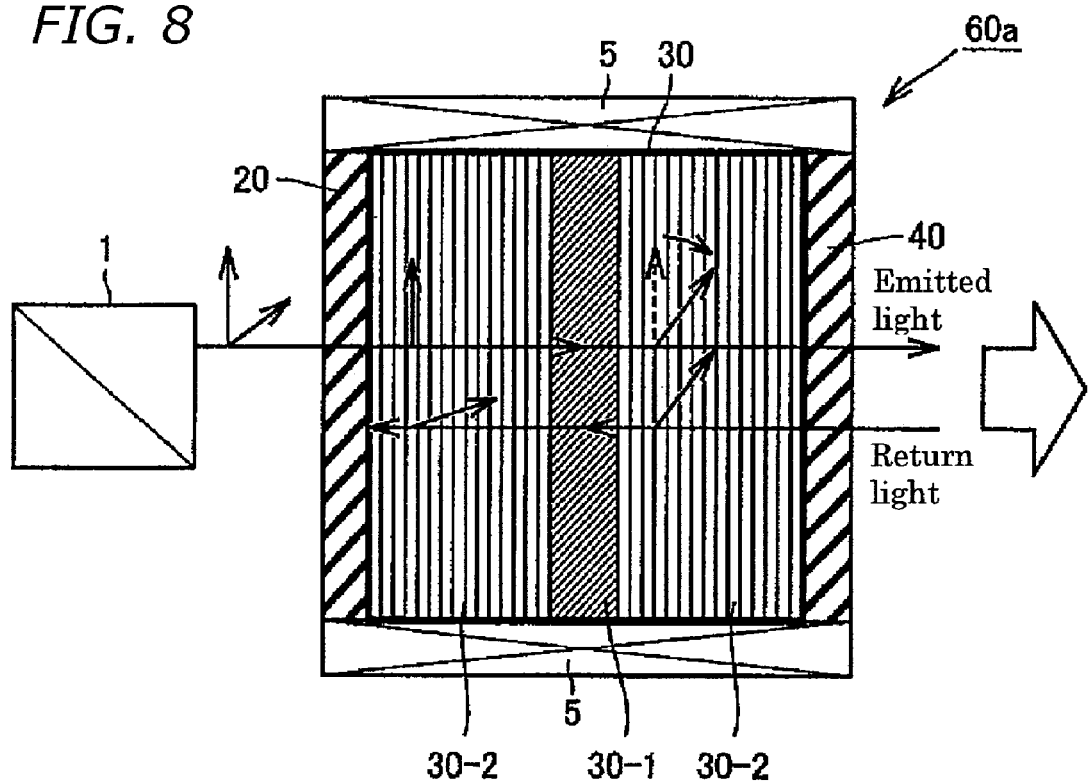
FIG. 8 is a view schematically illustrating an optical isolator of Embodiment 2 according to the invention.
Figure 9:
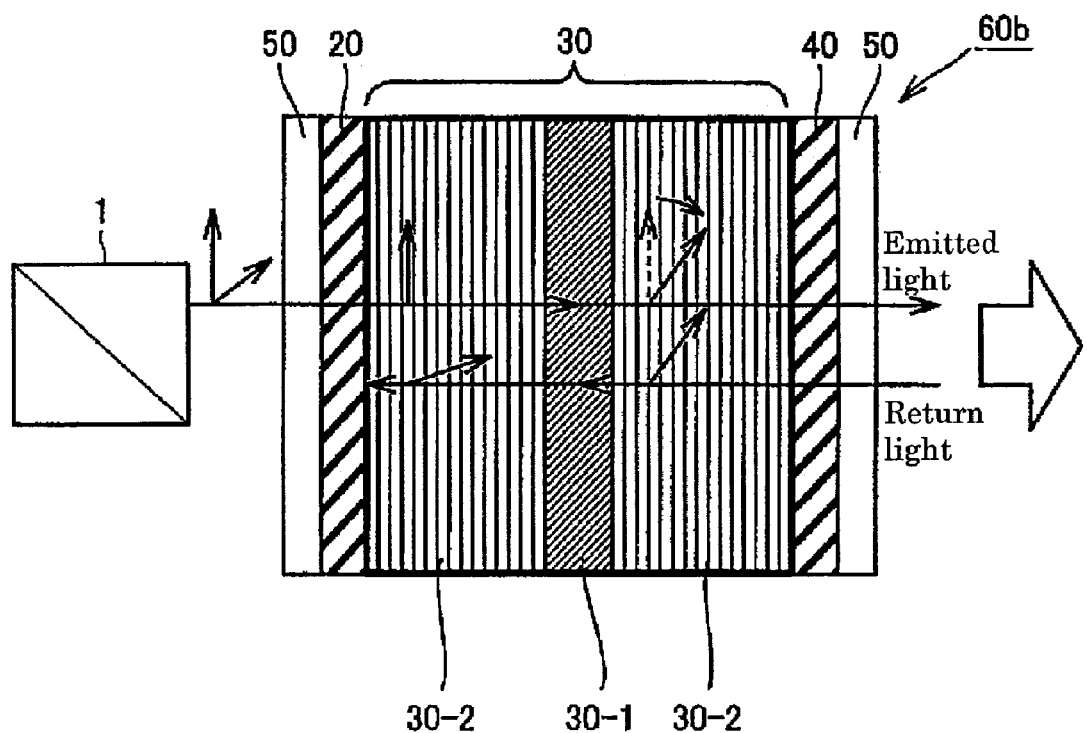
FIG. 9 is a view schematically illustrating an optical isolator of Embodiment 2 according to the invention.

FIGS. 8 and 9 are views schematically illustrating optical isolators of Embodiment 2 according to the invention.

Optical isolator 60a in FIG. 8 is constructed by arranging a polarizer 20 and an analyzer 40 on either side of the Faraday rotator depicted in Embodiment 1, and further arranging magnetic parts 5 along the top and bottom.

As explained in setting out Embodiment 1, the Faraday rotator 30 functions to selectively rotate only the polarization plane of incident light of a given wavelength(s). This enables optical isolator 60a incorporating the Faraday rotator 30 to selectively block only the return beams from the incident light of the given wavelength(s).

The polarizer 20 and the analyzer 40 can be constituted by irradiating a diamond-like carbon (DLC hereinafter) thin film along a bias with either a particle beam or an energy beam. (Details of a polarizer (analyzer) constituted using the DLC thin film will be described in Embodiment 3.)

According to the foregoing, in addition to the Faraday rotator 30 having a thin-film structure, inasmuch as the polarizer 20 and the analyzer 40 can also be rendered in a thin-film structure, integrating them by means of thin-film lamination technology enables miniaturizing and reducing the cost of the optical isolator 60a, and likewise allows the manufacturing process to be simplified.

Optical isolator 60b in FIG. 9 utilizes as magnetic parts 50 a gallium-nitride magnetic semiconductor thin film that exhibits ferromagnetism at room temperature. As shown in FIG. 9, the optical isolator 60b is structured by arranging the magnetic parts 50 on the outer sides of the polarizer 20 and the analyzer 40.

Because the gallium-nitride magnetic semiconductor thin film is transparent to light, it can be disposed in the path of the incident light beam.

This means that in addition to the polarizer 20, the Faraday rotator 30, and the analyzer 40, the magnetic parts 50 can be disposed in a straight line as shown in FIG. 9.

Accordingly, integrating these using thin-film lamination technology enables miniaturizing and curtailing the cost of optical isolator 60b further, compared with optical isolator 60a, and likewise lets the manufacturing process be simplified that much more.

Embodiment 3

Figure 10:
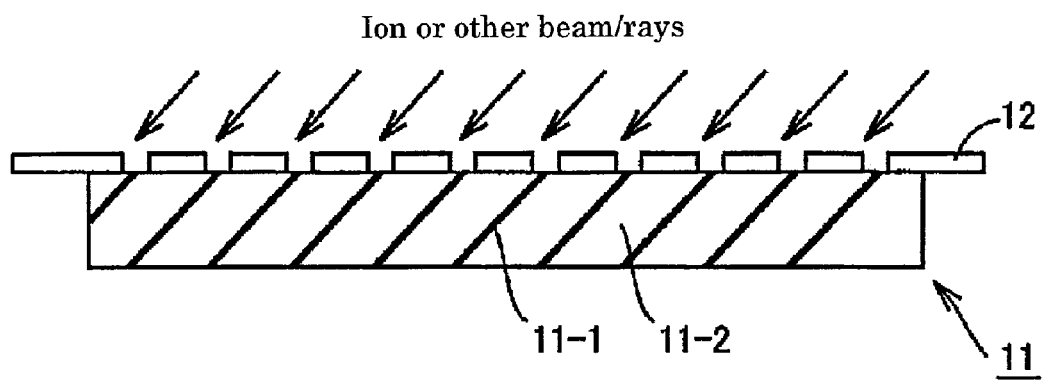
FIG. 10 is a view schematically illustrating a polarizer manufacturing process according to Embodiment 3 of the invention.

FIG. 10 is a view schematically illustrating a manufacturing process of a polarizer according to Embodiment 3 of the invention.

The polarizer is characterized in being formed by irradiating a DLC thin film 11 along a bias with either a particle beam or an energy beam. Although ion beams, electron beams, proton beams, α-rays and neutron beams are conceivable particle beams, and light rays, X-rays and γ-rays are conceivable energy beams, taking the example herein of irradiating with ion beams, a method of lending a refractive index distribution to the DLC thin film will be explained with reference to FIG. 10.

As indicated in FIG. 10, at first a mask 12 that is a transcription of a refractive-index distribution pattern is adhered atop the DLC thin film. From above the mask 12, oblique irradiation is performed with a beam of helium or argon ions, for example. The refractive index of the portions as at 11-1 receiving ion-beam irradiation through the transmitting areas of the mask 12 changes. Meanwhile, the refractive index of portions as at 11-2 cut off from the ion-beam irradiation by the blocking areas of the mask 12 does not change. Therefore, the refractive-index distribution of the DLC thin film may be controlled by changing the mask pattern. Exploiting this effect makes it possible to confer discrete polarization characteristics in the DLC thin film 11.

Here, the fact that by ion irradiation of a DLC thin film containing hydrogen, its refractive index can be altered within in a range extending from 2.0 to 2.5 has been reported in the journal *Diamond and Related Materials*, No. 7, 1998, pp. 432 to 434. It should also be understood that altering the refractive index through particle-beam irradiation such as ion irradiation, or through energy-beam irradiation, is not limited to hydrogen-containing DLC thin films, but is possible with, e.g., nitrogen-containing DLC thin films, and is possible with DLC thin films containing neither.

In this respect, the performance of a polarizer utilizing a DLC thin film was simulated with reference to the report that by ion irradiation of a DLC thin film containing hydrogen, its refractive index can be altered within in a range extending from 2.0 to 2.5. The simulation was carried out under a setting in which a DLC thin film—in which 25 laminae each, 50 laminae total, of a high refractive-index layer (refractive index 2.5) with a single lamina being 152.5 nm, and a low refractive-index layer (refractive index 2.0) with a single lamina being 190.63 nm, were laminated in alternation—was illuminated with an infrared beam, 1000 nm to 2000 nm in wavelength, at an incident angle of 65 degrees. Graphically represented in FIG. 11 are the results of this simulation.

Figure 11:
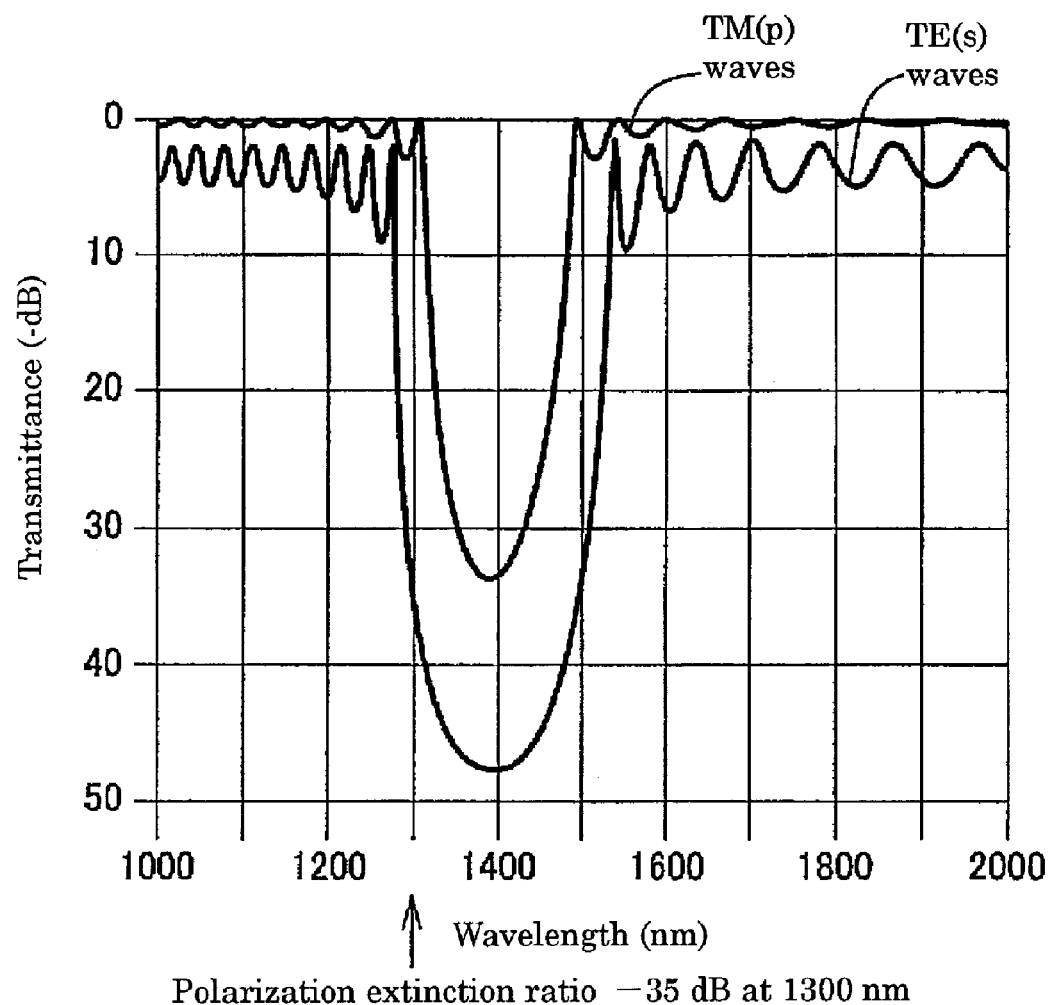
FIG. 11 is a graph representing, according to a simulation, the function of a polarizer utilizing a DLC thin film.

From FIG. 11 it is evident that the polarization extinction ratio at 1300 nm reaches approximately −35 dB. That fabricating a polarizer (analyzer) is possible by carrying out particle-beam irradiation such as ion irradiation, or energy-beam irradiation, at a bias on a DLC thin film may be ascertained from these results.

Next, DLC thin-film fabrication conditions will be discussed.

Existing techniques for film-formation of DLC thin films incorporating hydrogen include every sort of CVD (chemical-vapor-deposition) method employing heat or plasma, the sputtering method, the EB (electron-beam) deposition method, and the arc-ion-plating method (filtered-arc method). In practice, nevertheless, CVD methods, by which high-speed film formation is feasible, would seem to be the most suitable, given that they allow the introduction of a large quantity of hydrogen into the film, and that a film thickness on the order of 20 µm is required. In this respect, film formation by the parallel-plate plasma CVD method will be taken up.

As an example of the film-formation conditions with the parallel plate plasma CVD method: for substrate size, a 30-cm square; for film-formation-substrate temperature, 200 degrees centigrade, and pressure, $1.3 \times 10^1$ to $1.3 \times 10^{-1}$ Pa; for flow-volume of methane as the precursor gas, 100 sccm; apply a high frequency of 13.56 MHz at a power of approximately 100 W. Vacuum vessel: rotary pump and expansion pump, pressure-control with an orifice.

With either a particle beam or energy beam, irradiating along a bias a DLC thin film fabricated under the fabrication conditions noted above enables altering the refractive index of the DLC thin film. Controlling the refractive-index modification makes it possible to utilize the DLC thin film as a polarizer.

As in the foregoing, according to Embodiment 3, a polarizer adopting a thinly formed structure, yet laminated and integrated with other thin-film optical elements, may be fabricated by irradiating a DLC thin film along a bias, with either a particle beam or an energy beam.

Embodiment 4

Figure 12:
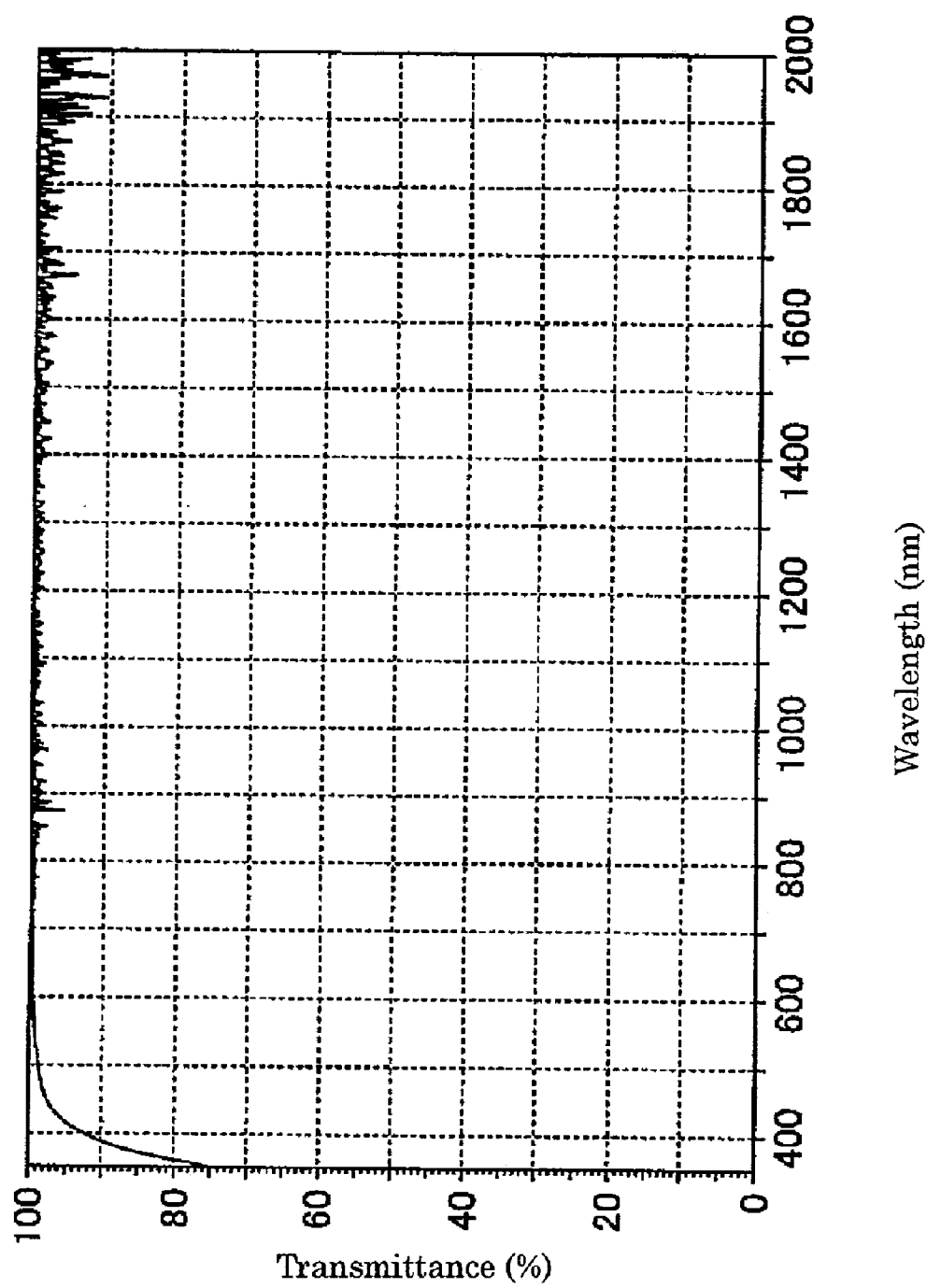
FIG. 12 is a chart diagramming measurement results on the spectral transmission characteristics of a DLC thin film actually fabricated using the parallel-plate plasma chemical vapor deposition (CVD) method.

FIG. 12 is a chart diagramming measurement results on the spectral transmission characteristics of a DLC thin film that, using the parallel-plate plasma CVD method, was actually fabricated. The DLC thin film was formed to have a film thickness of 1.0 µm onto a glass substrate 1.5 mm thick. Here, the DLC thin film was fabricated by altering the film-formation conditions under the parallel-plate plasma CVD method explained in Embodiment 3, to enhance its hydrogen concentration.

As indicated in FIG. 12, the DLC thin film fabricated in this instance has spectral transmission characteristics near 100% with respect to light of from 500 nm to 2000 nm in wavelength, which includes the wavelengths for optical communications. It should be understood that the spectral transmission characteristics in FIG. 12 are the "DLC thin-film internal transmittance," from which the influences of reflection at the obverse face of the DLC thin film, the reverse face of the glass substrate, and the boundary surface between the DLC thin film and the glass obverse face have been removed.

Figure 13:
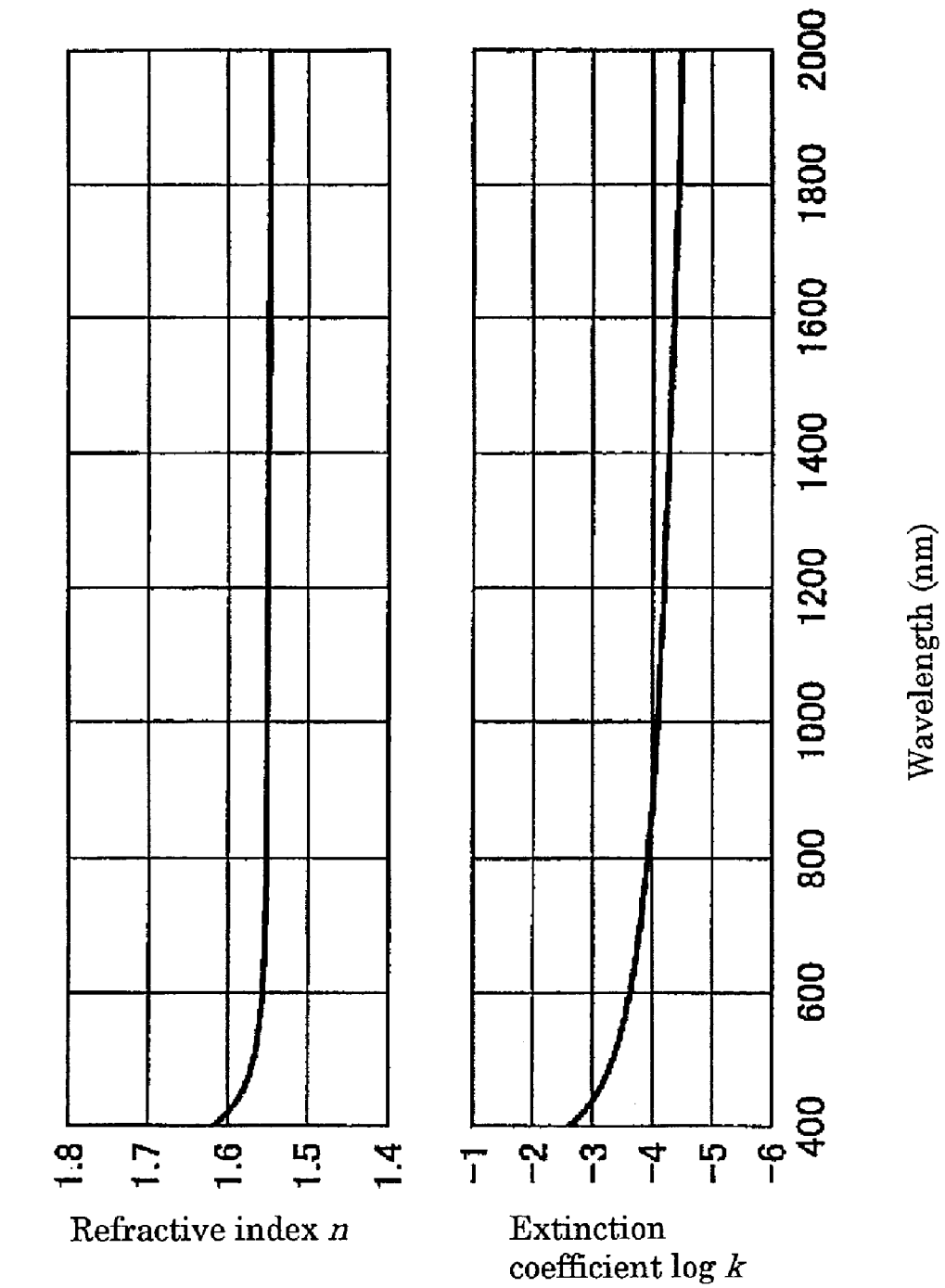
FIG. 13 is a chart diagramming the DLC thin film's optical characteristics, calculated based on the measurement results in FIG. 12.
Figure 14:
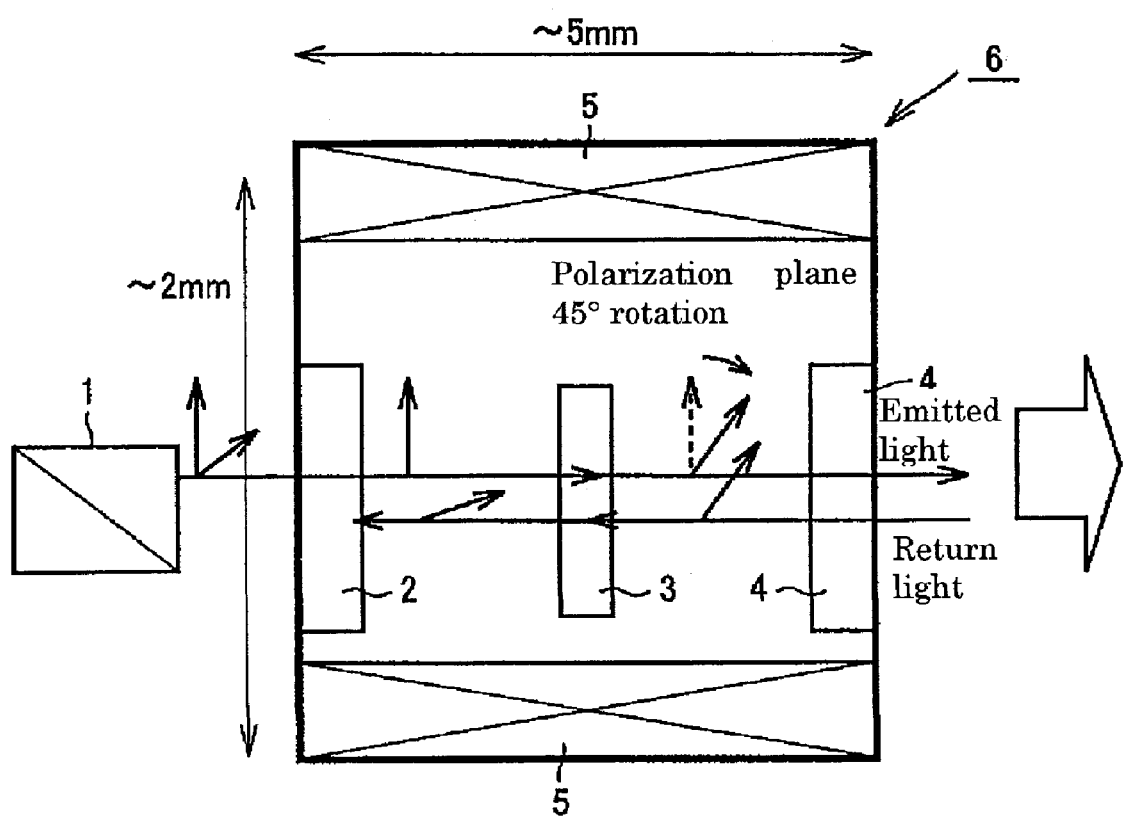
FIG. 14 is a view schematically illustrating the makeup of a general optical isolator.

FIG. 13 is a chart diagramming the DLC thin film's optical characteristics, calculated based on the measurement results in FIG. 12.

As indicated in FIG. 13, it will be understood that at for example a 1500 nm wavelength hypothesized for optical communications, the DLC thin film fabricated in this instance has a refractive index $n=1.55$, and an extinction coefficient $k=4.48 \times 10^{-5}$.

Meanwhile, pages 1758 to 1761 in the journal *Diamond and Related Materials*, No. 9, 2000 contain a recent representative article on measuring the optical characteristics of DLC. This article carries the absorption coefficient for DLC following helium ion irradiation with a $1.0 \times 10^{16}$ cm$^{-2}$ dose, as data pertaining to the DLC absorption coefficient at wavelength 1500 nm. The extinction coefficient k at wavelength 1500 nm was calculated based on this DLC absorption coefficient, whereupon it turned out to be $k=4 \times 10^{-4}$.

Accordingly, that at the 1500 nm wavelength hypothesized for optical communications, the DLC thin film fabricated in this instance has a remarkably low extinction coefficient compared with conventional DLC was verified. Furthermore, it can be read from FIG. 13 that even for a wavelength not only of 1500 nm, but also in the range of 1200 nm to 1700 nm, the extinction coefficient for the DLC thin film fabricated in this instance is $3\times10^{-4}$ or less, which is lower than the $4\times10^{-4}$ of conventional DLC. Advantages such as that the lower the extinction coefficient, the less is the signal attenuation in, e.g., the optical communications field will be appreciated.

Thus, the DLC thin film fabricated in this instance, which has superior characteristics not present to date, should have potential applied uses not only in optical communications, but also the polarizer described in Embodiment 3 to begin with, and in various other applications.

The modes of embodying disclosed on this occasion should be considered exemplifications in all respects, not limitations. The scope of the present invention is not the explanation set forth above, but is indicated by the scope of the claims; and the inclusion of meanings equivalent to the scope of the claims, and all changes within the scope, is intended.

As thus in the foregoing, under this invention, miniaturizing and moreover holding down the costs of Faraday rotators, polarizers, analyzers, magnetic parts, and optical isolators having these as their constituent elements, is made possible. Likewise, manufacturing Faraday rotators and optical isolators that can handle plural wavelengths is made possible. Furthermore, a new material useful in miniaturizing and in lowering the cost and enhancing the performance of polarizers to begin with, and of various sorts of optical devices, can be provided.

What is claimed is:

1. A method of qualitatively transforming a diamond-like carbon (DLC hereafter) film to create a distributed refractive index structure within the DLC film, the method comprising the steps of:
    adhering a mask to a top surface of the DLC film, the mask including a transcription of the distributed refractive index structure; and
    irradiating the mask and the DLC film, with either a particle beam or an energy beam, such that first selected regions of the DLC film receive said radiation, and second selected regions of the DLC film are blocked by the mask from receiving said radiation, said radiation effective to raise a refractive index of the first selected regions such that the distributed refractive index structure is created within the DLC film.

2. The DLC film-transforming method as set forth in claim 1, wherein:
    said particle beam is one selected from the group consisting of an ion beam, an electron beam, a proton beam, a-rays, or a neutron beam; and
    said energy beam is one selected from the group consisting of light rays, X-rays or γ-rays.

3. The DLC film-transforming method as set forth in claim 1, wherein the qualitative transformation is carried out on one selected from the group consisting of a hydrogen-containing DLC film; a nitrogen-containing DLC film; and a non-hydrogen-containing, non-nitrogen-containing DLC film.

4. The DLC film-transforming method as set forth in claim 1, wherein the qualitative transformation is carried out on a DLC film having, with respect to light having a wavelength within a range of from 550 nm to 650 nm, a refractive index smaller than 1.6 and an extinction coefficient smaller than $1\times10^{-3}$.

5. The DLC film-transforming method as set forth in claim 1, wherein the DLC film is irradiated with either the particle beam or the energy beam at a bias with respect to the film's thickness, whereby the distributed refractive index structure is created sloping with respect to the film's thickness.

6. The DLC film characterized by having a distributed refractive index pattern, the DLC film including a plurality of qualitatively transformed regions in which the refractive indices are changed, the DLC film created by a film-transforming method as set forth in claim 1.

7. The DLC film characterized by having a distributed refractive index pattern, the DLC film including a plurality of qualitatively transformed regions in which the refractive indices are changed, the DLC film created by a film-transforming method as set forth in claim 2.

8. The DLC film characterized by having a distributed refractive index pattern, the DLC film including a plurality of qualitatively transformed regions in which the refractive indices are changed, the DLC film created by a film-transforming method as set forth in claim 3.

9. The DLC film characterized by having a distributed refractive index pattern created by a film-transforming method as set forth in claim 4.

10. The DLC film characterized by having a distributed refractive index pattern created by a film-transforming method as set forth in claim 5.

11. A method of qualitatively transforming a DLC film, the method comprising the step of radiating with either a particle beam or an energy beam at least one region of the DLC film to raise the refractive index of that region to form a distributed refractive index within the DLC film; wherein, with respect to light having a wavelength within a range from 550 nm to 650 nm, the DLC film has a refractive index less than 1.6 and an extinction coefficient less than $1\times10^{-3}$.

12. A DLC film characterized by having refractive indices distributed in a pattern oriented within the plane of the film, wherein, with respect to light having a wavelength within a range from 550 nm to 650 nm, the DLC film has a refractive index less than 1.6 and an extinction coefficient less than $1\times10^{-3}$.

* * * * *